United States Patent [19]

Sozzi et al.

[11] 4,425,366

[45] Jan. 10, 1984

[54] PRODUCTION OF YOGURT

[75] Inventors: Tomaso Sozzi, Lausanne; Marcel E. A. Buhler, Tolochenaz; Jaroslav Dasek, Yverdon, all of Switzerland

[73] Assignee: Societe d'Assistance Techniques pour Produits Nestle S.A., Lausanne, Switzerland

[21] Appl. No.: 356,810

[22] Filed: Mar. 10, 1982

[30] Foreign Application Priority Data

Dec. 16, 1981 [CH] Switzerland .......................... 8019/81

[51] Int. Cl.³ .......................... A23C 9/12; C12N 1/20; C12R 1/225; C12R 1/46
[52] U.S. Cl. .......................... 426/43; 426/61; 435/253; 435/853; 435/885
[58] Field of Search .......................... 426/34, 42, 43, 61; 435/253, 853, 885

[56] References Cited

U.S. PATENT DOCUMENTS 4,156,019  5/1979  Kondratenko et al. .............. 426/43

FOREIGN PATENT DOCUMENTS 2445840  4/1976  Fed. Rep. of Germany ........ 426/43
45-35221  11/1970  Japan .................................... 426/43
49-38824  10/1974  Japan .................................... 426/43

OTHER PUBLICATIONS

Chebbi et al., Caseinolytic Activity of Lactic Acid Bacteria, J. Gen. Appl. Microbiol., vol. 20, 1974, (pp. 149–152).

Tamime et al., Yogurt: Technology and Biochemistry, J. of Food Protection, vol. 43, 1980 (pp. 966 and 967).

*Primary Examiner*—David M. Naff
*Attorney, Agent, or Firm*—Vogt & O'Donnell

[57] ABSTRACT

Yogurt having a reduced increase in acidity and bitterness during storage at ambient temperature is produced by fermenting milk with *Streptococcus thermophilus* and a *Lactobacillus bulgaricus* strain which has low proteolytic activity and allows a DNA–DNA hybridization of from 80 to 100%. A thickening strain of *Streptococcus thermophilus* may be used. The yogurt may be packed under sterile conditions and stored at about 20° C.

5 Claims, No Drawings

PRODUCTION OF YOGURT

The object of this invention is to provide a process for the production of a yogurt with a long storage life, in which process, fresh or reconstituted milk is fermented with a combination of strains of *Streptococcus (S.) thermophilus* and *Lactobacillus (L.) bulgaricus* and a gel containing the living strains is obtained.

Different methods are known for pasteurizing yogurt after the production thereof which effectively increase the keeping properties thereof. However, a heated or pasteurized yogurt contains practically no living microorganisms and thereby loses one of its most valued qualities.

However, it is known that to restrict bacterial growth, conventional, unpasteurized yogurt may be preserved at a temperature of about 4° C. However, the enzymes of the lactic bacteria of the yogurt still have some activity at this temperature. Even if bacterial growth is no longer observed, an increase in acidity and the development of a bitter taste which lowers the quality of the yogurt is still found.

Moreover, a process is known which uses strains of *S. thermophilus* and *L. bulgaricus* which are selected for their resistance to elevated temperatures. When these strains are used they can be inoculated into milk at from 52° to 60° C., kept in the milk at this temperature for 5 to 30 minutes, for example, and after a first short acidification step at a conventional temperature of from 40° to 48° C., acidification can be continued at a "low" temperature of from 34° to 37° C. up to coagulation. The yogurt which is obtained in this manner is clearly distinguished by an improved capacity for storage, i.e. by a slower increase in acidity and a later development of bitterness. However, such a low temperature process is critical, because the duration thereof is much longer, about 10 hours, and the process is carried out in conditions which are close to those in which the lactic bacteria of the yogurt no longer grow.

Another process is also known, in which widemouthed glass bottles are sterilized, the inside walls of the bottles are covered with a conventional starting culture, milk is poured into the bottles at a temperature of from 85° to 100° C., the bottles are sealed hermetically, cooled with tap water and subjected to a conventional incubation lasting from 4.5 to 6 hours at 45° C. up to coagulation, in this case, until the pH of a control has fallen to 4.5. A process of this type is suitable for avoiding infection of the yogurt, i.e., the growth of undesirable microorganisms, but it is of no use for restricting the increase in acidity and the development of a bitter taste during storage.

An object of the present invention is to provide a process for the production of yogurt, which process on the one hand improves the storage properties of the yogurt with respect to the development of acidity and a bitter taste, while leaving the living strains of yogurt in the product, and which on the other hand allows rapid coagulation of the milk whih is at least as fast as that of the conventional process.

The present invention also aims to provide a yogurt which has the above-mentioned qualities.

For this purpose, the process according to the present invention is characterised in that the milk is fermented with a combination of strains in which the *L. bulgaricus* strain has a low proteolytic activity and allows a level of DNA-DNA hybridization of from 80 to 100% with one of the strains of *L. bulgaricus* CNCM I-179, I-180 and I-181. The said *L. bulgaricus* strain which has a low proteolytic activity is preferably one of said CNCM I-179, I-180 and I-181 strains.

It has in fact been found that some strains of *L. bulgaricus* possess the property of ceasing to produce lactic acid at a pH which is higher than normal, notably at a pH approaching 5. Moreover, it is known that *S. thermophilus* produces lactic acid very rapidly, but stops production at a pH approaching 4.5. It was then found that a combination of *L. bulgaricus* which ceases acidification at a pH approaching 5 and of *S. thermophilus* allowed the production of a yogurt having improved keeping properties with respect to increase in acidity and bitterness. This could be explained by the fact that these particular strains of *L. bulgaricus* have a low proteolytic activity and thus produce few of the metabolites which, on the one hand promote growth and consequently acidification and, on the other hand are at the origin of the formation of bitter peptides. Strains of *L. bulgaricus* were then selected systematically as a function of their low proteolytic activity and three typical strains having this property were deposited on Dec. 9, 1981 with the Collection Nationale de Cultures de Microorganismes at the Institut Pasteur at Paris in France where they were given respectively the numbers CNCM I-179, I-180 and I-181.

It was then confirmed that the *L. bulgaricus* strains having the desired property are extremely similar and that in particular, a degree of DNA-DNA hybridization between them of from 80 to 100% is possible, this being determined in the manner described below under the heading of "Hybridization Tests".

Finally, it has been found that fermentation of milk with the combination of a strain of *L. bulgaricus* having the desired property of low proteolytic activity with at least one strain of *S. thermophilus* which is conventional for yogurt, such as may be obtained from known suppliers of starting cultures, can be carried out in times and under conditions which are at least as favourable as those used for the production of conventional yogurts.

The yogurt according to the present invention is characterised in that it contains from 10 to 20% by weight of dry matter from milk and has per $cm^3$ about $10^5$ to $10^8$ organisms of a strain of *L. bulgaricus* of low proteolytic activity allowing a level of DNA-DNA hybridization of from 80 to 100% with one of the strains of *L. bulgaricus* CNCM I-179, I-180 and I-181 and has a per $cm^3$ from about $10^7$ to $10^{10}$ organisms of *S. thermophilus*. As for the process, the said *L. bulgaricus* strain of low proteolytic activity is preferably one of the strains of *L. bulgaricus* CNCM I-179, I-180 and I-181. The present yogurt has remarkable keeping qualities with respect to increase in acidity and development of a bitter taste, compared to conventional commercial yogurts.

In order to carry out the process according to the present invention, a pasteurized animal and/or vegetable milk may be used as the starting material, being fresh or reconstituted, skimmed, semi-skimmed or whole, and containing from 10 to 20% by weight of dry material. This milk may be inoculated with from 2 to 10% by total volume of a culture containing from about $10^5$ to $10^8$ organisms per $cm^3$ of the said strain of *L. bulgaricus* and from about $10^7$ to $10^{10}$ organisms of *S. thermophilus*. Moreover, in a preferred practical Example, the milk may be inoculated with from 1 to 5% by total volume of a culture containing from about $10^7$ to $10^{10}$ per $cm^3$ organisms of thickening *S. thermophilus*. The milk may be fermented for 2.5 to 6 hours at a temperature of from about 35° to 48° C. The yogurt thus produced may then be preserved as it is under refrigeration or at a temperature of about 20° C. if it has been packed under sterile conditions.

As far as the sub-culturing of the individual strains is concerned, the culture medium may be a fresh or reconstituted milk, the fermentability of which has been confirmed in a manner known to the skilled man, and which contains from 9 to 12% by weight dry matter and to which is added from about 0.1 to 5% by volume of activator in the form of yeast extract, for example. The individual strains may be sub-cultured in a proportion of from about 1 to 5% by volume of culture for *S. thermophilus* and from about 5 to 10% by volume for *L. bulgaricus*, and they may be incubated for about 1 to 5 hours at about 40° to 43° C. up to a pH of about 4.4 to 5.2.

The medium may be the same for the preparation of the starting cultures as for the sub-cultures. A single starting culture may be prepared for *L. bulgaricus* and *S. thermophilus* by inoculating the medium in a proportion of from about 2 to 10% by volume of culture for *L. bulgaricus* and from 1 to 5% by volume for *S. thermophilus* and incubating for about 3 to 5 hours at about 40° to 43° C. up to a pH of from 4 to 5. In the method in which a strain of thickening *S. thermophilus* is also used, a separate starting culture may be prepared by inoculating the medium in a proportion of from about 1 to 6% by volume of culture and incubating for about 1 to 3 hours at from about 40° to 43° C. up to a pH approaching 5.

The starting cultures are then directly used for inoculating the milk in the production of the yogurt.

The following Examples preceeded by the "Hybridization tests" mentioned above are provided by way of Example. In these Examples, the term "milk" is used to mean cow's milk, unless otherwise stated and the bacteria were counted on an MRS medium.

Hybridization tests

DNA-DNA hybridization tests are carried out between the strains of *L. bulgaricus* CNCM I-179, I-180 and I-181. For these tests, samples of each microorganism are taken. They are subjected to lysis in an aqueous solution using lysozyme and with the addition of sodium lauryl sulphonate. The DNA is isolated from the lysate and is purified by the methods of H. Saito and K. I. Miura, Biophys. Acta 72, 619–629 (1963) and I. Baess, Acta Pathol. Microb. Scand, 82, 780–784 (1974). The DNA-DNA hybridization is analysed by the method of De Ley, J. H. Cattoire and A. Reynaerts, Eur. H. Biochem. 12, 133–142 (1970) as modified and described by M. V. Norgard and P. F. Bartell, Gilford, Res. Rev. 3, 1–5 (1978). The following results are obtained:

| | |
|---|---|
| CNCM I-179 with CNCM I-180 | 100% |
| CNCM I-179 with CNCM I-181 | 86% |
| CNCM I-180 with CNCM I-181 | 95% |

EXAMPLE 1

On a medium of reconstituted skimmed milk containing 10% dry matter and mixed with 1% of yeast extract, two starting cultures are prepared having respective pH values of 4.67 and 4.66 and having respective Soxhlet-Henkel (°SH) degrees of acidity of 36.60 and 34.45, the first culture containing $4.3 \times 10^7$ *S. thermophilus* organisms per cm$^3$ and $7.5 \times 10^6$ of *L. bulgaricus* CNCM I-179 organisms per cm$^3$ and the second culture containing $22 \times 10^7$ of thickening *S. thermophilus* organisms per cm$^3$.

40 l of whole milk mixed with 1 kg of skimmed powder milk are inoculated with 2.8 l of the first starting culture and 0.4 l of the second. The inoculated milk is stirred and is filled into pots which are incubated for 4 hours at 41° C. The yogurt which is obtained has a good texture and taste. It has a pH of 4.66 and contains $62 \times 10^{17}$ *S. thermophilus* organisms and $5 \times 10^6$ *L. bulgaricus* organisms per cm$^3$.

Storage tests are carried out at 4° C. and at 20° C. The pH and the °SH are measured and the bacteria are counted. The evolution is observed after 24 hours and after 1, 2, 3 and 4 weeks. The results are provided in the following Table:

| Storage time | Storage at 4° C. | | | Storage at 20° C. | | | | |
|---|---|---|---|---|---|---|---|---|
| | | | | | | organisms | | |
| | pH | °SH | Taste | pH | °SH | S. × 10$^7$ | L. × 10$^6$ | Taste |
| 24 h | 4.63 | 38.75 | | 4.43 | 43.50 | 42 | 32 | |
| 7 days | 4.49 | 48.65 | | 4.16 | 55.30 | 18 | 3 | |
| 14 days | 4.44 | 45.95 | | 4.11 | 58.20 | 19 | 3 | good |
| 21 days | 4.36 | 46.75 | good | 4.10 | 60.15 | 28 | 2 | good |
| 28 days | 4.21 | 45.80 | good | 4.10 | 60.15 | 20 | 1.1 | good |

Comparative Tests

Comparative tests parallel to those of Example 1 and carried out on a conventional yogurt distributed by a large chain store result in a pH lower than 4 from the first week, i.e., pH values of 3.94; 3.89 and 3.83 after, 1, 2 and 3 weeks storage at 20° C. The taste of the yogurt was very acid and bitter as early as the first days.

EXAMPLE 2

A reconstituted skimmed milk is prepared in a proportion of 3 kg of powder in 17 l of water. It is inoculated with 1.4 l of the first starting culture described in Example 1 and with 0.2 l of the second culture. The inoculated milk is stirred and is filled into pots which are incubated at 41° C. for 4 hours. A yogurt is obtained which has a good texture and taste and has storage qualities similar to those of the yogurt of Example 1.

EXAMPLES 3 TO 7 AND COMPARATIVE EXAMPLE

On a reconstituted skimmed milk medium containing 12% by weight dry matter and mixed with 1% by weight of yeast extract, from 20 to 200 l of various starting cultures are prepared for yogurt production. The characteristics of these starting cultures are shown in the following Table, where the letters S. and L. which are used on their own denote *S. thermophilus* and *L. bulgaricus*:

| Ex. No. | Starting culture | pH | °SH | organisms | |
|---|---|---|---|---|---|
| | | | | S. × 10$^7$ | L. × 10$^6$ |
| 3 | S. + L. CNCM I-181 | 4.51 | 40.80 | 20 | 5 |
| 4 | S. + L. CNCM I-180 | 4.52 | 41.40 | 38 | 4.5 |
| 5 | S. + L. CNCM I-180 | | | 45 | 23 |
| 6 | S. + L. CNCM I-181 | 4.28 | 51.80 | 24 | 60 |
| 7 | S. + L. CNCM I-179 | 4.22 | 53.50 | 11 | 40 |

Using these various cultures, yogurts are made from a whole milk to which is added skimmed powder milk to obtain a dry matter content of 15% by weight. For each of the processes corresponding to the different Examples, the milk is inoculated with 9% by volume of the culture S.+L. The inoculated milk is stirred and is filled into pots which are incubated at 41° C. for 4 hours for Examples 3 and 4, 3.5 hours for Example 5, 5.25 hours for Example 6, and 6 hours for Example 7. Yogurts are obtained having a good texture and taste which keep better than conventional commercial yogurts with respect to increase in acidity and the development of a bitter taste. The characteristics of the yogurts which were obtained and their capacity for storage are shown in the following Table which gives an account of measurements generally made immediately at the end of incubation, and 24 hours and 7, 14, 21 and 28 days thereafter. This Table also illustrates by way of comparison the result of parallel measurements made on a typical conventional yogurt of commerce.

and is pasteurized at 90° C. for 30 minutes. It is then cooled to 41° C. and inoculated with a starting culture of *L. bulgaricus* CNCM I-181 and *S. thermophilus*. It is incubated for 3 hours up to pH 4.7. A good product is obtained having an excellent texture.

We claim:

1. A yogurt having a long storage life comprising:
    (a) 10 to 20% by weight of dry matter of animal and/or vegetable milk;
    (b) from about $10^5$ to $10^8$ organisms per $cm^3$ of a *Lactobacillus bulgaricus* strain having low protein activity selected from the group consisting of *Lactobacillus bulgaricus* CNCM I-179, I-180 and I-181; and
    (c) $10^7$ to $10^{10}$ organisms per $cm^3$ of *Streptococcus thermophilus*.

2. A process for the production of a yogurt having a long storage life and containing living microorganism strains comprising:
    (a) innoculating fresh or reconstituted milk with from

| Ex. No. | Storage time | Storage at 4° C. | | | Storage at 20° C. | | | | |
|---|---|---|---|---|---|---|---|---|---|
| | | pH | °SH | Taste | pH | °SH | organisms S. × $10^7$ | L. × $10^6$ | Taste |
| 3 | 0 | | | | 4.78 | 33.75 | 12 | 3.1 | |
| | 24 h | 4.70 | 37.90 | | 4.47 | 42.35 | 12 | 4.7 | |
| | 7 days | 4.48 | 44.00 | | 4.12 | 55.70 | 4 | 7 | |
| | 14 days | 4.48 | 44.05 | | 4.05 | 61.40 | 18 | 2 | good |
| | 21 days | 4.42 | 43.85 | good | 4.07 | 61.95 | 23 | 15 | good |
| | 28 days | 4.27 | 45.00 | good | | 67.80 | 15 | 5 | good |
| 4 | 0 | | | | 4.74 | 35.85 | 19 | 1.2 | |
| | 24 h | 4.61 | 40.00 | | 4.49 | 42.40 | 18 | 2.5 | |
| | 7 days | 4.42 | 45.30 | | 4.11 | 57.70 | 16 | 7 | |
| | 14 days | 4.42 | 46.60 | | 4.05 | 61.20 | 12 | 1.6 | good |
| | 21 days | 4.35 | 46.50 | | 4.08 | 62.50 | 17 | 6 | good |
| | 28 days | 4.21 | 45.80 | | | 65.50 | 10 | 7 | good |
| 5 | 0 | | | | 4.75 | 36.40 | | | |
| | 24 h | 4.55 | 39.70 | | 4.40 | 44.40 | 30 | 2 | |
| | 7 days | 4.53 | 40.05 | good | 4.13 | 55.20 | 30 | 7 | good |
| | 14 days | 4.37 | 43.20 | good | 4.01 | 61.65 | 7 | 15 | good |
| | 21 days | 4.36 | 44.40 | good | | | | | |
| | 28 days | 4.38 | 45.50 | good | | | | | |
| 6 | 0 | | | | 4.67 | 35.35 | | | |
| | 24 h | 4.64 | 36.65 | good | 4.41 | 41.80 | 10 | 6 | good |
| | 7 days | 4.39 | 41.00 | good | 3.99 | 58.25 | 10 | 20 | good |
| | 14 days | 4.38 | 42.85 | good | 3.91 | 61.80 | 3.3 | 3.6 | good |
| | 21 days | 4.41 | 42.50 | good | 3.94 | 65.90 | 7.2 | 2.4 | good |
| | 28 days | 4.36 | 43.70 | good | 3.88 | 66.30 | | | |
| 7 | 0 | | | | 4.68 | 38.35 | | | |
| | 24 h | 4.63 | 40.00 | good | 4.50 | 44.00 | 1 | 38 | good |
| | 7 days | 4.43 | 41.60 | good | 4.05 | 56.75 | 3 | 2.4 | good |
| | 14 days | 4.40 | 44.40 | good | 3.99 | 61.95 | 1.7 | 0.9 | good |
| | 21 days | 4.38 | 45.10 | good | | | | | |
| | 28 days | 4.36 | 44.75 | good | 3.93 | 66.60 | | | good |
| Comparison | 24 h | 4.10 | 57.35 | | 4.04 | 58.00 | 18 | 200 | |
| | 7 days | 4.04 | 59.35 | | 3.94 | 68.40 | 2 | 60 | |
| | 14 days | 4.05 | 63.00 | | 3.89 | 74.20 | 33 | 50 | acid |
| | 21 days | 3.98 | 63.20 | | 3.83 | 79.00 | 72 | 0.8 | acid, bitter |

Thus, it is seen that with the present product, it is possible to dispense with the refrigeration chains at the stages of storage, distribution and consumption if the yogurt pots are filled under controlled sterile conditions. This is impossible with the conventional commercial yogurts. Thus, the present process opens the way to a simplified technology and to a reduction in the investments at the stages of manufacture, distribution and consumption.

EXAMPLE 8

1 kg of skimmed powder milk, 1 kg of dehulled whole soya reduced to powder and 18 l of water are mixed at 50° C. The mixture is homogenized at this temperature 2 to 10% by total volume of a culture containing
    (i) from about $10^5$ to $10^8$ organisms per $cm^3$ of a strain of *Lactobacillus bulgaricus* having low protein activity selected from the group consisting of *Lactobacillus bulgaricus* CNCM I-179, I-180 and I-181; and
    (ii) from about $10^7$ to $10^{10}$ organisms per $cm^3$ of *Streptococcus thermophilus*; and then
(b) fermenting the innoculated milk to provide a gel.

3. A process according to claim 2, wherein the milk is inoculated with from 1 to 5% by total volume of a culture containing from about $10^7$ to $10^{10}$ organisms per $cm^3$ of thickening *Streptococcus thermophilus*.

4. A process according to claim 2, wherein a pasteurized animal and/or vegetable milk which is fresh or reconstituted, skimmed, semi-skimmed or whole and contains from 10 to 20% by weight dry matter is fermented.

5. A process according to claim 2, wherein the milk is fermented for 2.5 to 6 hours at a temperature of from 35 to 48° C.

* * * * *

UNITED STATES PATENT AND TRADEMARK OFFICE
CERTIFICATE OF CORRECTION

PATENT NO. : 4,425,366

DATED : January 10, 1984

INVENTOR(S) : Tomaso Sozzi, et al.

It is certified that error appears in the above—identified patent and that said Letters Patent is hereby corrected as shown below:

On the front title page of the patent, in the assignee's name, "Techniques" should read --Technique--.

Column 4, line 11, "$62 \times 10^{17}$" should read --$62 \times 10^7$--.

*Signed and Sealed this*

*Tenth Day of April 1984*

[SEAL]

*Attest:*

GERALD J. MOSSINGHOFF

*Attesting Officer*     *Commissioner of Patents and Trademarks*